(12) United States Patent
Grantz et al.

(10) Patent No.: US 6,344,828 B1
(45) Date of Patent: Feb. 5, 2002

(54) ANTENNA SYSTEM FOR A SATELLITE-SUPPORTED VEHICLE NAVIGATION DEVICE

(75) Inventors: Helmut Grantz, Sindelfingen; Ronald Heuthe, Neckarwestheim; Volker Petri, Aidlingen; Max Reeb, Goeppingen; Hannes Wagner, Esslingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/465,944

(22) Filed: Dec. 17, 1999

(Under 37 CFR 1.47)

(30) Foreign Application Priority Data

Dec. 17, 1998 (DE) ......................................... 198 58 299

(51) Int. Cl.⁷ ................................................. H01Q 1/32
(52) U.S. Cl. ........................................ 343/713; 343/711
(58) Field of Search ................................ 343/713, 711, 343/712

(56) References Cited

U.S. PATENT DOCUMENTS

| | | | | |
|---|---|---|---|---|
| 4,764,773 A | * | 8/1988 | Larsen et al. | 343/713 |
| 5,105,201 A | | 4/1992 | Nakase et al. | 343/715 |
| 5,155,494 A | * | 10/1992 | Bryant et al. | 343/713 |
| 5,212,492 A | * | 5/1993 | Jesman et al. | 343/713 |
| 5,278,572 A | * | 1/1994 | Harada et al. | 343/713 |
| 5,343,214 A | * | 8/1994 | Hadzoglou | 343/713 |
| 5,539,418 A | * | 7/1996 | Egashira et al. | 343/712 |
| 5,557,290 A | | 9/1996 | Watanabe | 343/713 |
| 5,612,652 A | | 3/1997 | Crosby | 333/24 R |
| 5,714,959 A | * | 2/1998 | Troy et al. | 343/713 |
| 5,973,648 A | * | 10/1999 | Lindenmeier et al. | 343/713 |

FOREIGN PATENT DOCUMENTS

| | | |
|---|---|---|
| DE | 41 40 864 A1 | 6/1992 |
| DE | 43 29 697 A1 | 3/1995 |
| DE | 196 02 657 | 8/1996 |
| DE | 195 07 997 A1 | 9/1996 |
| DE | 297 10 675 U1 | 9/1997 |
| EP | 0 444 416 | 1/1991 |

OTHER PUBLICATIONS

Dynamische Verkehrs–leitsysteme, Funkschau (1997) pp. 26–31.

Microstrip–Antennen, Funkschau (1998).

Mehrelemente–Saltelliten–Mobilfunk Antennen Für GPS–und Kommunikati–onsanwendung in Microstrip–Technologie, Georg Splitt, Hans Forster (Apr. 1, 1992).

* cited by examiner

*Primary Examiner*—Don Wong
*Assistant Examiner*—Trinh Do Dinh
(74) *Attorney, Agent, or Firm*—Crowell & Moring LLP

(57) ABSTRACT

An antenna system for a satellite-supported navigation device in a vehicle includes a part which is to be arranged on the exterior of a mounting surface of the vehicle body and which contains an antenna component, a system part to be arranged on the interior, and a coupling device for coupling on antenna signal and a power supply between the exterior part and the interior part. The coupling devices includes signal transmission devices which transmit power supply signals and, as required, also data signals in a wireless manner through the mounting surface between the exterior and the interior parts.

14 Claims, 4 Drawing Sheets

ANTENNA SYSTEM FOR A SATELLITE-SUPPORTED VEHICLE NAVIGATION DEVICE

BACKGROUND AND SUMMARY OF THE INVENTION

This application claims the priority of German patent document 198 58 299.4, filed Dec. 17, 1998, the disclosure of which is expressly incorporated by reference herein.

The invention relates to an antenna system for communication between vehicle-mounted navigation systems and satellites for determining the vehicle position, such as the so-called GPS (Global Positioning System).

U.S. Pat. No. 5,105,201 discloses an antenna system for a car radio in which the antenna is arranged on the rear window of a motor vehicle, and a resonant oscillating circuit situated on the exterior side of the rear window is assigned to the antenna. Another resonant oscillating circuit is situated on the interior of the rear window opposite the first resonant oscillating circuit and is electromagnetically coupled with the exterior resonant oscillating circuit and feeds the signals coupled into it to a radio receiver. As the result, the radio receiver can receive radio signals without a direct line connection to the antenna.

In conventional antenna systems of the initially mentioned type, the antenna itself (which, for the purposes of the present application) is frequently constructed as a so-called patch antenna, is provided for the exterior-side mounting on a given mounting surface, for example, on a vehicle rear window. For optimal communication with the satellites situated above the horizon, the selection of a vehicle body part which extends as nearly horizontally as possible is preferred as the mounting surface. The present exterior mounting of the antenna component, in comparison to the alternatively customary systems in which the antenna component is mounted on the inside of the vehicle body, has the advantage that it does not require such precise tuning of the antenna and such an exact mounting of the antenna. It is therefore highly suitable for retrofitting; and in series applications, the need for separate tuning of the antenna to accommodate the material and geometry of the mounting surface for different vehicle types is eliminated.

The antenna systems, for example, for the GPS, usually contain an antenna amplifier (to compensate for line losses and for the impedance matching) which normally forms a common constructional unit with the antenna component and is fed by a direct voltage supply. Furthermore, the antenna system has a signal processing unit, for example, in the form of a receiver and analysis unit; that is, a receiver which demodulates high-frequency locating signals received from the satellite by way of the antenna components, decodes them and determines therefrom the actual vehicle position therefrom, which it then sends as a position data signal with a standardized serial data protocol to a navigation unit.

In addition to the satellite-supported vehicle position determination, conventional antenna systems of the initially mentioned type may also have other functions, for example, for a mobile telephone and/or a car radio, as described in the essays "Dynamic Traffic Control Systems", *Funkschau* 13/1997, Page 26, and "Microstrip Antennas", *Funkschau* 6/1998, Arbeitsblätter Antennen, Part 10, as well as G. Splitt, H. Forster, "Multi-Element Satellite Mobile Radio Antennas for GPS and Communication Applications in Microstrip Technology", Special Committee "Antennas" of the ITG, Discussion Conference of Apr. 1, 1992. These antenna systems and additional antenna systems of this type which are commercially available must penetrate the mounting surface in order to implement the direct-voltage supply line for the antenna amplifier and/or the signal line, by means of which the amplifier output signal is provided to the interior-side signal processing unit. For this purpose, it is known to use a single coaxial cable and by way of this signal cable achieve the power supply as a so-called phantom powering.

German Patent Document DE 43 29 697 A1 describes an access control device (for example, a central locking system of a motor vehicle) which comprises a vehicle-fixed sending and receiving unit. The sending and receiving unit is capable of exchanging information signals with a portable transponder unit in order to permit remote operation of a central locking system outside the vehicle. In a normal operating mode, the transponder unit receives its electric energy from a button cell. In an emergency operating mode, it can draw the energy required for operating the transponder from a prolonged or repeated inquiry code signal which is emitted from the vehicle-fixed sending and receiving unit.

U.S. Pat. No. 5,557,270 discloses a capacitive coupling device for two coaxial cables, which comprises a dielectric plate (for example, a glass plate) with electrodes arranged on opposite sides thereof. The electrodes are each connected by way of an inductance with the line core of the two coaxial cables. On both sides of the dielectric plate, a conductive housing is provided which is connected to the conductive sheath of the coaxial conductors.

One object of the invention is to provide an antenna system of the initially mentioned type which requires no holes in the mounting surface and is largely independent of the material and the geometry of the mounting surface and is therefore well suited also for retrofitting.

This and other objects and advantages are achieved by antenna system according to the invention, which includes a part which is to be arranged on the interior, and a coupling device for coupling an antenna signal and a power supply between the exterior part and the interior part. The coupling devices between the exterior and the interior system parts consist of signal transmission devices which achieve current supply and preferably also the data communication through the mounting surface in a wireless manner, and therefore without requiring breakthroughs or holes in the mounting surface. Current supply preferably takes place inductively.

The antenna system according to the invention is suitable for the mounting on glass and on all other non-conductive mounting surfaces. Because of the exterior arrangement of the antenna component, the difficulties encountered by prior art antennas with respect to damping, disconnecting and tuning of the antenna (inherent, for example, to a behind-the-glass mounting) do not occur. The design of the antenna system remains largely independent of the material and the geometry of the mounting surface and therefore of the vehicle type.

In one embodiment of the invention, the transmission of the data signals received or sent by way of the antenna system (in the following also called antenna signals or useful signals) through the mounting surface takes place capacitively (that is, by means of electric fields), inductively or optically (that is, by means of corresponding electromagnetic waves).

In another embodiment of the antenna system according to the invention, an current is supplied inductively by means of primary and secondary inductive open-field or closed-field helical-path structures which can be implemented in a flat shape and permit the transmission of sufficient energy also, for example, for sending data.

In a further embodiment of the invention, the inductive helical-path structures are implemented in closed-field construction, with a course which at least once changes the looping direction and/or are provided with an encompassing short-circuit mask on their primary and/or secondary side. This permits the transmission of comparatively high energies without an interfering far-field effect. In still a further embodiment of the invention, the short-circuit mask is simultaneously constructed as a heating element, whereby the exterior-side system part can always be maintained at a defined minimum temperature.

In another embodiment, the primary and/or the secondary inductive closed-field structure has on its back side a covering, magnetically conductive field guiding layer, in which the transmitting magnetic field or fields can be guided. The magnetically conductive field guiding layer may be coated in an electrically highly conductive manner on its surface away from the structure so that a magnetic blocking surface is formed, whereby, for example, exterior-side sending and/or receiving components for data signals can be uncoupled with respect to an electromagnetic energy transmission field.

According to a further feature of the invention, an optical transmission of the data signals may take place by means of separate light transmission routes for received data signals and data signals to be sent.

In yet another embodiment of the antenna system according to the invention, an antenna amplifier is assigned to the exterior antenna component. To supply this antenna amplifier with power, corresponding alternating-voltage signals are fed by a coupling coil unit in a wireless manner from the interior through the mounting surface. In addition, a capacitive coupling unit is provided by means of which the amplified antenna signals are transmitted. Further the antenna component, the antenna amplifier and an exterior-side coupling surface of the capacitive coupling unit may be arranged next to or within an exterior-side coupling coil of the coupling coil unit. The last-mentioned variant of a concentric arrangement of the exterior-side system components in the interior of the exterior-side coupling coil minimizes the surface requirement of the antenna construction.

In an antenna system further developed according to the invention, a signal processing unit is assigned to the external antenna component, which signal processing unit comprises a suitable receiving and/or sending part and a pertaining signal processing part, optionally with a signal analyzing function. For their voltage supply, corresponding alternating-voltage signals are guided in a wireless manner from the interior by way of a coupling coil unit through the mounting surface. The coupling coil unit is simultaneously used for the transmission of the antenna signals processed by the signal processing unit.

In a further development of the invention, the antenna component and the signal processing unit are positioned next to or within an exterior coupling coil of the coupling coil unit on the exterior of the mounting surface. The variant with the concentric arrangement of the exterior-side system components in the interior of the exterior-side coupling coil is again particularly suitable for achieving a minimum surface requirement.

In still another embodiment of the invention, an antenna amplifier and/or a signal processing unit is provided in the interior of the vehicle, and not on the exterior side of the vehicle. The antenna signals (the signals supplied by or fed to the antenna component) are transmitted by a capacitive coupling unit in a wireless manner through the mounting surface between the antenna component and the amplifier or the signal processing unit.

Finally, according to another feature of the invention, the interior-side system part contains a coaxial line which carries the antenna signals as well as the power supply alternating-voltage signals. For this purpose, the two signal types are situated in preferably considerably different frequency ranges.

Other objects, advantages and novel features of the present invention will become apparent from the following detailed description of the invention when considered in conjunction with the accompanying drawings.

DETAILED DESCRIPTION OF THE DRAWINGS

In FIGS. 1 to 5, which illustrate various embodiments of an antenna system for a GPS navigation system in an automobile, functionally corresponding elements are designated by the same reference numbers. In each embodiment, the antenna structures are mounted in an upper area of a vehicle rear window 1, which acts as the mounting surface. An external antenna part is arranged on the outside on the rear window 1, while components of an interior part are situated on the inside of the rear window. From the latter, line connections lead to antenna and/or navigation system components arranged farther away in the vehicle interior, such as a GPS receiver and/or a navigation unit. The illustrated implementations share the common feature that signal transmission between the exterior and interior parts takes place in a wireless manner through the rear window 1, without need for breaking through the rear window 1 for this purpose. The various embodiments differ mainly with respect to the placement of the various system components, which will be discussed in detail in the following.

Figure 1:
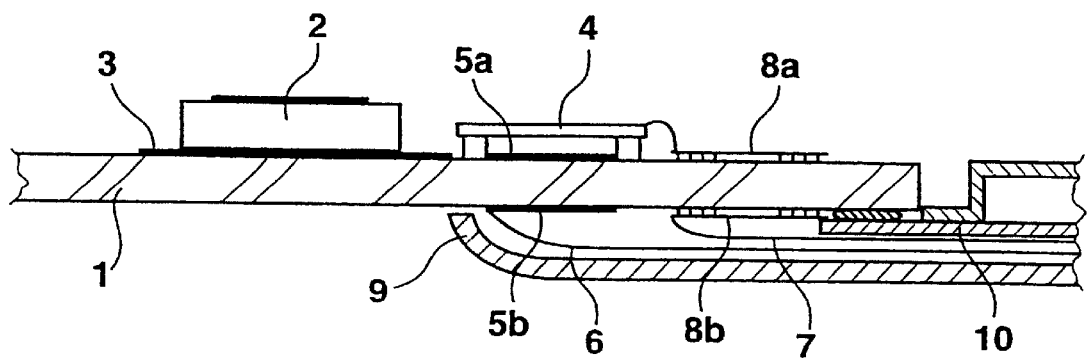
FIG. 1 is a schematic longitudinal sectional view of a first mounted GPS antenna system in a side-by-side arrangement with an exterior amplifier.

As in all other embodiments, in the embodiment of FIG. 1, the exterior part contains an antenna component in the form of a GPS antenna 2 (preferably a conventional patch antenna) applied to the outside of the rear window, with a grounding surface 3 inserted between the antenna 2 and the rear window 1 as the reference ground. The exterior part also includes an antenna amplifier 4 which is positioned next to the antenna 2 and which taps and amplifies the GPS satellite signals received by the antenna 2. Amplified antenna signals are transmitted through the rear window 1 to the interior via a capacitive coupling unit which consists of an exterior coupling surface 5a and an interior coupling surface 5b. The exterior coupling surface 5a is applied to the outside of the rear window under the structure of the antenna amplifier 4 and is conductively connected with the latter. The interior coupling surface 5b is placed opposite the exterior coupling surface 5a, on the inside of the rear window. From there, an antenna signal line 6 leads to components which follow (not shown), such as a conventional GPS receiver. The latter operates as a receiving and analyzing unit in that it demodulates and decodes the fed high-frequency GPS signals and determines the momentary vehicle position therefrom. This receiver then emits this position information as a corresponding position data signal with a standardized serial data protocol to a connected navigation unit of the automobile.

In order to also supply the necessary power to the outside antenna amplifier 4 without any rear window breakthrough, the electric energy, in the form of a corresponding alternating-voltage signal, is fed from an alternating current source (not shown), via a power supply line 7 to a coupling coil unit in the form of a loosely coupled transmitter, which consists of an exterior coupling coil 8a and an interior coupling coil 8b. The exterior coupling coil 8a is applied to the outside of the rear window opposite the antenna 2, next to the amplifier 4, and is conductively connected with the latter. The interior coupling coil 8b is positioned on the inside of the rear window, opposite the exterior coupling coil 8a. The two coupling coils 8a, 8b of the transmitter can be constructed as printed coils, and transmit electric energy fed in the vehicle interior in a wireless manner, through the rear window 1 for feeding the amplifier 4.

For the power supply alternating-voltage signal, a frequency, such as 100 kHz, is selected, which differs sufficiently from the high-frequency GPS signal (whose frequency is typically at 1.575 GHz) so that no mutual interferences will occur between the antenna signal transmission from the outside to the inside, on the one hand, and the power supply signal transmission in the opposite direction, on the other hand. In addition, because of the significant frequency differences, as required, the antenna signal line 6 and the power supply line 7 can be integrated into a single coaxial cable instead of using separate lines. The antenna 2 is constructed such that it is sufficiently uncoupled from the capacitive coupling unit 5a, 5b, by means of corresponding shielding.

As illustrated in FIG. 1, the system components arranged on the inside of the rear window (the interior coupling surface 5b and the interior coupling coil 8b with their line connection), are hidden from view behind an interior covering 9, with the antenna signal line 6 and the power supply line 7 being continued between the interior covering 9 and a vehicle body flange 10 framing the rear window 1.

Figure 2:
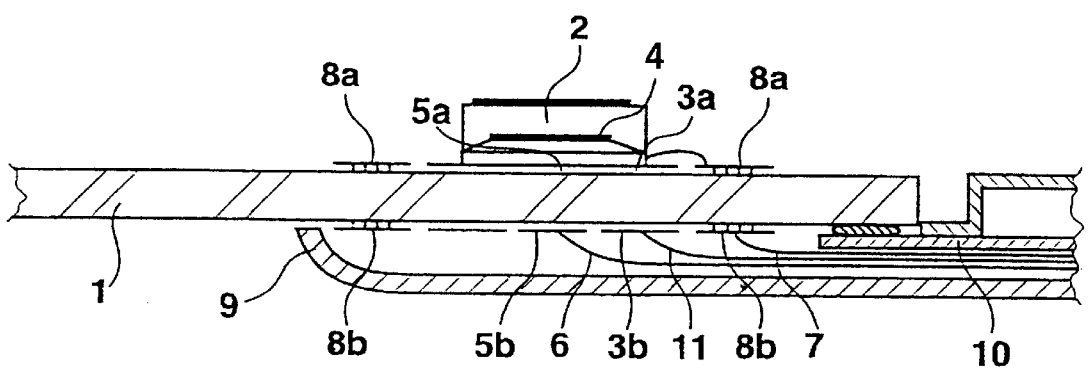
FIG. 2 is a schematic longitudinal sectional view of a second antenna system, which functionally corresponds to the first system, in a concentric arrangement.

The embodiment illustrated in FIG. 2 corresponds functionally to that of FIG. 1, differing only in the concentric placement of the components, instead of the side-by-side arrangement of FIG. 1. Specifically, in the embodiment of FIG. 2, the amplifier 4 is arranged below the structure of the GPS antenna 2, the exterior coupling surface 5a being situated within the amplifier 4 on the rear window 1, specifically within an exterior-side ground surface 3a which is modified to this extent to a ring shape. (The ground surface 3a is opposite a corresponding inside ground surface 3b, within which the interior coupling surface 5b is situated). All these above-mentioned components are concentrically surrounded by the exterior or interior coupling coil 8b, 8b. By means of this concentric arrangement, the surface space requirement can be minimized, so that the whole structure can be accommodated in the rear window area which is covered by the interior covering 9 anyhow. For reference grounding, the interior side ground surface 3b is connected to a grounding conductor 11.

Figure 3:
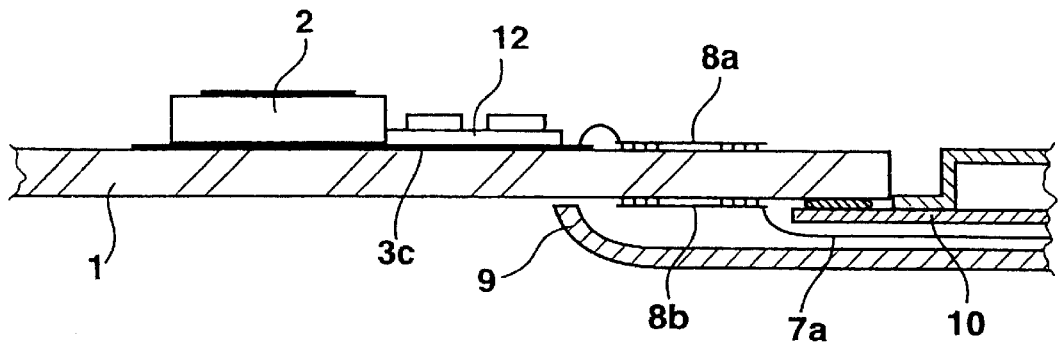
FIG. 3 is a schematic longitudinal sectional view of a third mounted GPS antenna system in a side-by-side arrangement, with the exterior receiver.

In the embodiment of FIG. 3, the above-mentioned GPS receiver 12 is arranged not in the vehicle interior, but next to the GPS antenna 2 on the outside of the rear window 1. The antenna amplifier 4 of FIGS. 1 and 2, which is otherwise used to compensate line losses and for the impedance matching, can be eliminated in this case, or can be integrated in the GPS receiver 12.

In this case, the coupling coil unit 8a, 8b is used to supply power to the GPS receiver 12; for this purpose, the receiver is conductively connected with the outside coupling coil 8a. In this embodiment, the coupling coil unit 8a, 8b is simultaneously used for the antenna signal transmission; more precisely, for transmitting the position signal with the serial data protocol emitted by the GPS receiver 12, which operates as the receiving and analyzing unit. For this purpose, the power supply alternating-voltage signal is applied to the inside coupling coil 8b only at defined intervals, for example, only for a duration of 500 ms during a second, while, in the power supply pauses, the serial data protocol with the locating information is transmitted via the same signal path, but in the opposite direction in that it is applied to the exterior-side coupling coil 8a.

For transmission of both signal types, a common coaxial cable 7a can be used, without need of special shielding. In this embodiment, the capacitive coupling unit can be eliminated. An exterior ground surface 3c modified to this extent extends not only under the antenna 2 but, in addition, under the receiver 12. The antenna 2, the receiver 12 and the outside coupling coil 8a are situated side-by-side on the outside of the rear window, and the remaining inside system component (the interior coupling coil 8b), is covered by the interior covering, and is thus protected from view. From there, the coaxial cable 7a leads between the interior covering 9 and the vehicle body flange 10 to a navigation unit (not shown).

Figure 4:
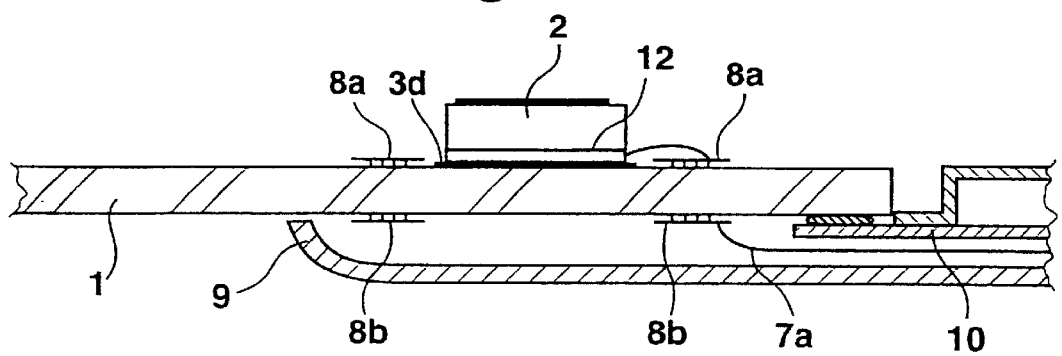
FIG. 4 is a schematic longitudinal sectional view of a fourth antenna system, which functionally corresponds to the third system, in a concentric arrangement.

The embodiment illustrated in FIG. 4 corresponds functionally to that of FIG. 3 but, instead of the side-by-side component arrangement, has a concentric component arrangement analogous to FIG. 2. Specifically, in the embodiment of FIG. 4, the GPS receiver 12 is positioned on an exterior ground surface 3b modified to this extent below the structure of the GPS antenna 2. The above-mentioned components are situated concentrically within the exterior coupling coil 8a, which is opposed by the interior coupling coil 8b (protected from view by the interior covering 9).

It is demonstrated that this concentric arrangement again minimizes the demand for rear window mounting surface space, and the antenna system as a whole can be accommodated in the rear window area framed by the interior covering 9.

Figure 5:
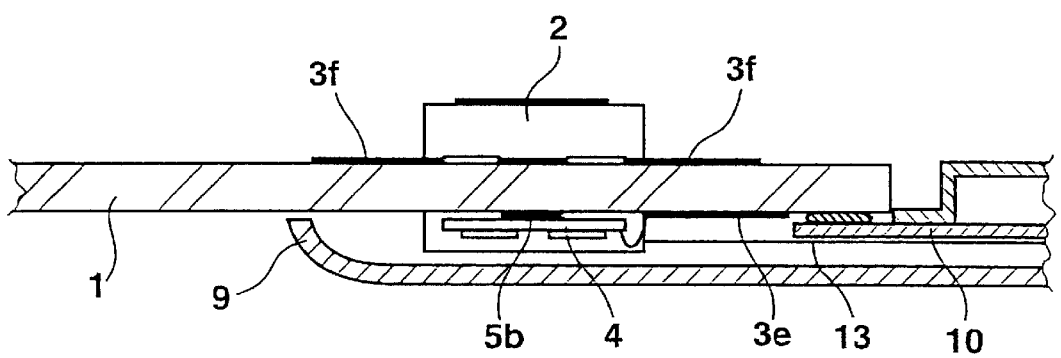
FIG. 5 is a schematic longitudinal sectional view of a fifth mounted GPS antenna system with an interior amplifier.

FIG. 5 shows an embodiment which only the passive part of the antenna system (that is, the GPS antenna component 2) is mounted on the outside of the rear window 1. The antenna amplifier 4, optionally additionally or instead, the GPS receiver, is arranged opposite the antenna 2 on the inside of the rear window. The signal tapped from the antenna 2 is directly transmitted in a wireless manner through the rear window 1 to the amplifier 4 and receiver. For this purpose, the corresponding capacitive coupling unit 5a, 5b is provided, however an exterior coupling surface 5a situated under the structure of the antenna 2, while its interior coupling surface 5b is situated under the structure of the amplifier 4 or receiver. Since no power has to be supplied to exterior system components, the coupling coil unit can be eliminated here. A line 13 continued between the interior covering 9 and the vehicle body flange 10 is used to transmit the amplified antenna signal to a GPS receiver which follows. When the receiver is placed on the inside of the rear window, it transmits the position data signal emitted by the latter to a navigation unit which follows. For the purpose of a reference grounding, suitable interior and exterior ground surfaces 3e, 3f are provided again.

As illustrated in FIG. 5, the entire antenna system structure in this embodiment can also be arranged with a very low surface demand on the rear window 1, within the window area framed by the interior covering 9. In addition, this embodiment has analogous characteristics and function, as indicated above with respect to the example of FIG. 1, which also applies to the examples of FIGS. 2 to 4.

FIGS. 6 to 10 illustrate embodiments according to the invention of advantageous wireless transmission structures coupling the interior and exterior system parts of a vehicle antenna system, with energy transmission from the interior to the exterior and a unidirectional or bidirectional data signal transmission, in each case, through a mounting surface, such as a vehicle window surface. The application of coupling structures is shown in particular which use electric and/or electromagnetic fields and/or waves, in a so-called closed-field construction. In this case, as a result of the corresponding construction, the electric and/or magnetic field lines are kept contained within a limited range, and therefore do not significantly extend into a far-field range. This has the advantage that such coupling structures are insensitive to far-field coupling and decoupling; therefore, they offer a corresponding EMV (electromagnetic compatibility) protection, for example, against an emission and against other radiation-sensitive or radiation-emitting components in the vehicle. Such inductive closed-field structures can be achieved, for example, by oppositely disposed (reversed) conductor windings which are situated above one another or side-by-side, and through which current flows. It can also be achieved by a short-circuit winding surrounding the inductive winding structure (a so-called short-circuit mask). These structures can be provided on the primary side (the sending side) and/or on the secondary side (the receiving side), in which case, depending on the application, the sending part is arranged on the interior or exterior antenna system part and the receiving part is arranged on the respective other antenna system part. Possible inductive winding structures for a coupling through a vehicle window include, for example figure-eight-shaped windings, meander-shaped windings and helical windings.

Figure 6:
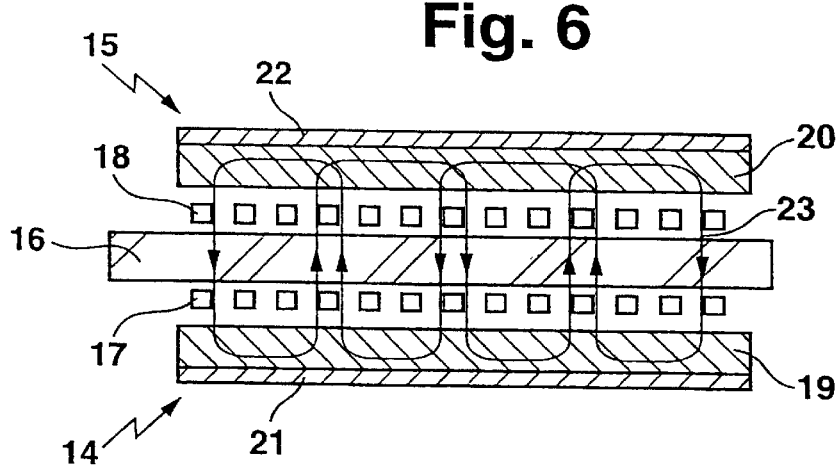
FIG. 6 is a schematic longitudinal sectional view of an antenna system with a closed-field structure.

FIG. 6 shows such an inductive closed-field structure between an interior system part 14 and an exterior system part 15, which can be utilized for the wireless transmission of power supply signals from the interior system part 14 to the exterior system part 15 through a glass window 16. In this case, the exterior system part 15 can form the antenna base of an antenna, which is otherwise not shown. On their sides facing the window, the two antenna system parts 14, 15 each have one inductive closed-field structure 17, 18, which are arranged to match one another and each consist, for example, of a combined helical meander-type winding structure. On the sides of the inductive coupling structures 17, 18 facing away from the window, respective magnetically conductive field guiding layers are provided in the form of a ferrite foils 19, 20. In turn, on its side facing away from the coupling structure, each of the latter is provided with an electrically highly conductive coating 21, 22. This coupling structure permits electromagnetic energy transmission between the two system parts 14, 15, in which the magnetic field flux lines 23 remain virtually completely limited to the area between the electrically highly conductive coatings 21, 22, without extending beyond it into a far-field range. Optionally, a short-circuit mask, which surrounds the pertaining inductive coupling structure 17, 18, can be provided for each system part.

Figure 7:
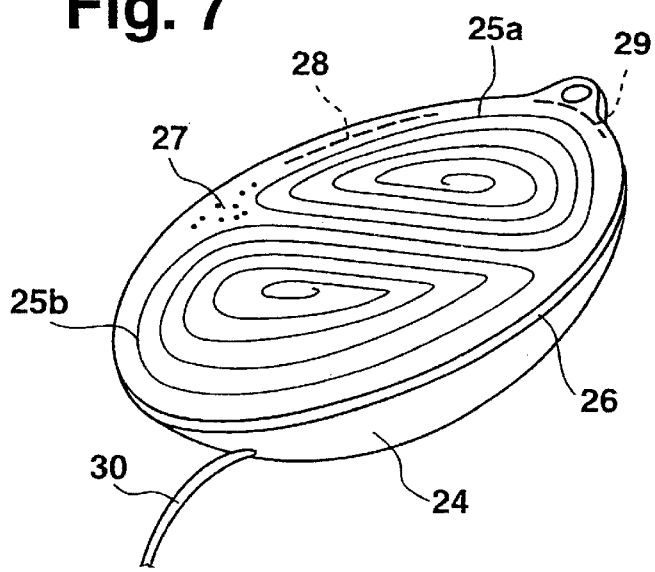
FIG. 7 is a schematic perspective view of an interior-side system part of an antenna system with an inductive closed-field helical structure.

In a perspective top view shown in FIG. 7, an inductive coupling structure in the form of two spirals 25a, 25b, which are also suitable for the embodiment of FIG. 6, is provided on the coupling side of the system part 24, the other components of the interior system part 24 (not shown) being accommodated in its housing. The coupling structure 25a, 25b is carried on a contact surface 26. The interior part 24 can be fixed, for example, on a vehicle window, by means of an adhesive coating 27. As required, if the pertaining mounting surface is curved, the structure-bearing contact surface 26 may be provided with a compensating layer which, after mounting of the antenna part, remains in a shape compensating the mounting surface curvature. The coupling structure 25a, 25b is optionally surrounded by a short-circuit winding 28 which is only partially outlined by a broken line.

In order to permit simple and precise adjustment of the coupling structure 25a, 25b of the interior system part with that of the exterior system part (not shown), an adjusting marking is constructed at one point on an edge of the housing of the interior system part 24. This adjusting marking 29 can then be aligned with a corresponding adjusting marking, so that then the interacting coupling structures are precisely adjusted. A connection cable 30 is used to feed and transmit power supply and data signals.

Figure 8:
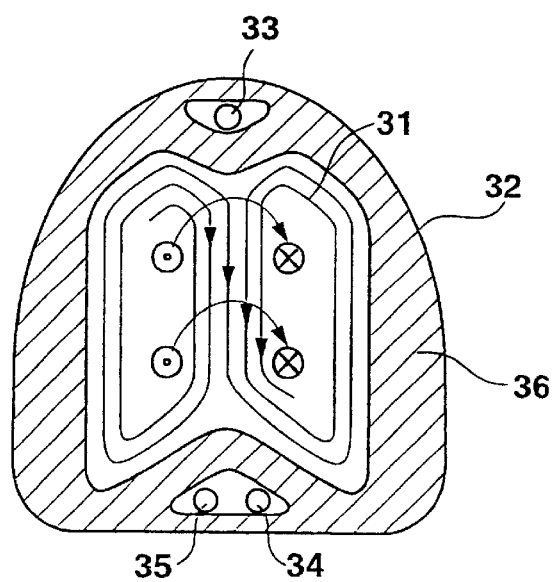
FIG. 8 is a schematic top view of an interior-side system part of an antenna system with an inductive closed-field power supply coupling and an opto-electronic data signal coupling.

FIG. 8 is a top view of the underside (the contact side), of an interior part of an antenna system with an optical data signal transmission. The coupling structure provided here for the wireless transmission of power supply and data signals contains an inductive closed-field structure 31 for energy transmission from the interior system part 32 to a corresponding exterior system part (not shown), a receiving LED 33, a sending LED 34 and a status LED 35. The coupling structure is surrounded by a ground mask 36. Analogously to the embodiment of FIG. 6, the carrier of the coupling structure may contain a ferrite foil with an exterior-side metalization, in which case the foil may be applied to a PCB laminate. By means of an adhesive contact foil, the interior system part 32 can be mounted, for example, on a vehicle window, in which case the adhesive contact foil has a gap-filling effect between the window and the inductive structure 31. At the points of the LEDs, the ferrite foil is provided with corresponding openings for the purpose of light transfer. By way of the sending and receiving LEDs 33, 34 of the interior system part 32 which are opposite corresponding receiving and sending LEDs on the exterior system part, data signals can be transmitted bidirectionally between the interior and the exterior system parts in a wireless optical manner. By way of the status LED, status information can be optically transmitted between the system parts.

The inductive coupling structures illustrated in FIGS. 6 to 8 permit the transmission of the total energy required for operation of the exterior system part, even if the associated antenna operates as a transmitting antenna (and for this purpose requires transmitting energies of, for example, 5 W).

Figure 9:
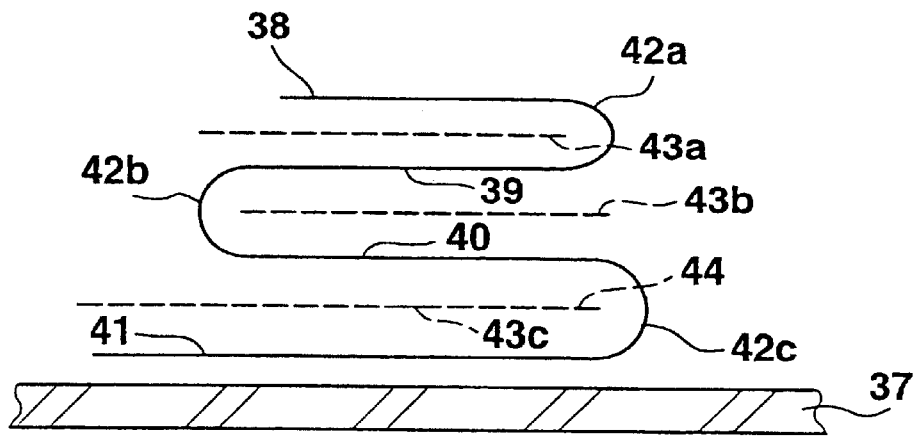
FIG. 9 is a schematic sectional view of an exterior-side multi-layer system part of another antenna system.

FIG. 9 is a schematic view of another advantageous construction of the exterior part of an antenna system which can be mounted, for example, on the outside on a vehicle window 37. Here, the exterior part is constructed as a layer laminate with an exterior antenna carrier layer 38, a data receiving and/or data sending layer 39 situated underneath, an energy conversion and frequency processing layer 40 and a window-side coupling layer 41. The individual layers 38 to 41 have, for example, a circular design of a diameter which decreases from the window 37 to the outside, and are connected with one another by stripshaped folding zones 42a, 42b, 42c. Between respective adjacent layers, insulating layers 43a, 43b, 43c are inserted. The intermediate layer 43c adjoining the coupling layer 41 may be constructed as a ferrite foil packing, which is provided with a metal layer 44 on its side facing away from the coupling layer. The one-piece formation of this exterior part by way of the folding zones 42a, 42b, 42c permits a multi-layer implementation which requires no separate bonding between the individual layers 38 to 41; on the contrary, these may be guided by way of the folding zones 42c, 42b, 42c. This facilitates exterior mounting, and increases functional reliability.

Figure 10:
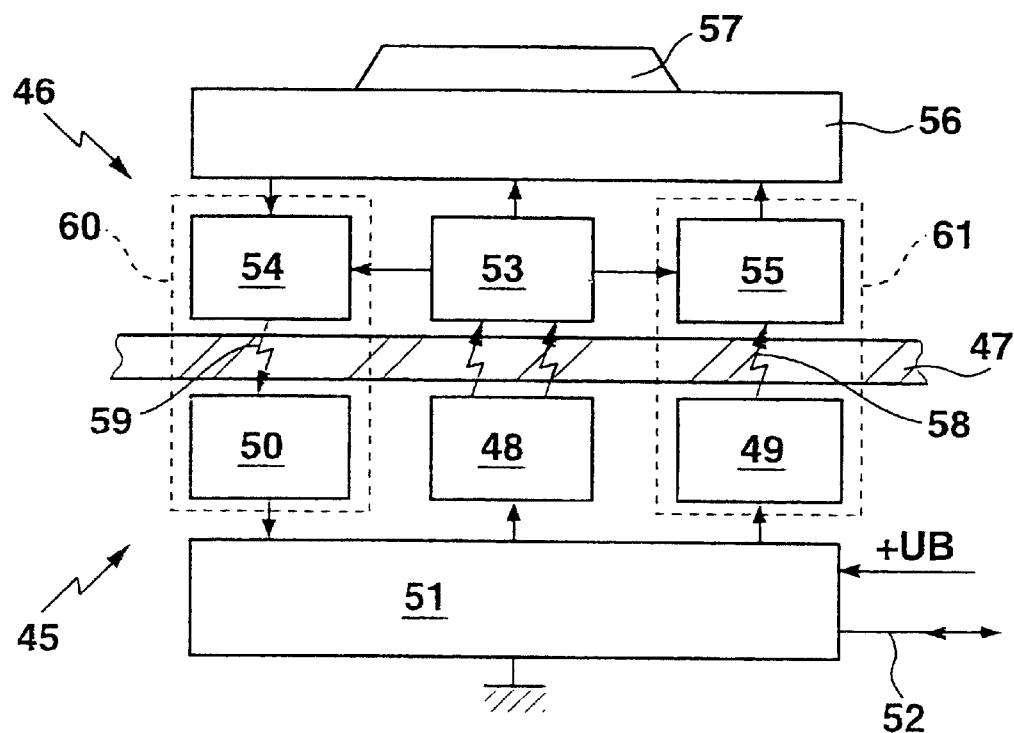
FIG. 10 is a schematic block-diagrammatic sectional view of the construction of an antenna system suitable, for example, for a telecommunication system.

FIG. 10 is a schematic view of an antenna system which is suitable for bidirectional data transmission, for example, as a component of a telecommunication system in the vehicle.

This antenna system contains an interior part 45 and an exterior part 46, which are mounted on the inside and the outside on a vehicle window 47 and comprise a coupling which permits energy transmission from the inside to the outside, as well as bidirectional data transmission. For this purpose, the interior part contains a power supply signal generator 48, a data sending part 49 and a data receiving part 50. These three components are connected to a sending/receiving control unit 51 with a suitable data interface, which control unit 51 is supplied by a fed voltage $+U_B$ and is connected to a bidirectional data line 52.

In a manner which matches the transfer components of the interior part 45, the exterior part 46 contains a power supply signal receiver 53, a data sending part 54 and a data receiving part 55, which are connected to a sending/receiving duplex switch 56 with which an antenna component 57 is connected. The data signal couplings 58, 59 between the respective sending and receiving part 49, 54 and 50, 55, according to the requirements, may be capacitively, inductively or optically implemented. The glass pane 47 can act as a separating point at any point in the signal processing path of the data transmission part 60, 61 formed in each case of a sending and a receiving part. One transmission part 61 operates as the sending transmission part—that is, for transmission of data to be sent from the antenna system—and the other transmission part 60 correspondingly operates as a receiving transmission part, for the transmission of data received from the antenna system. This means that, in the respective transmission part 60, 61, the components can be divided in an arbitrary manner most favorable with respect to the application into the interior and the exterior system part 45, 46.

Particularly when using flat patch antenna components, it is advantageous to prevent icing; that is, to be able to cause a fast defrosting. For this purpose, the exterior system part can be heated by a heating element which receives energy exclusively by transmission from the interior system component, so that no separate energy has to be externally supplied for heating purposes. For this purpose, an ohmic heat resistance element is preferably constructed on the exterior part, which heat resistance element is advantageously operated by direct current for the purpose of ensuring the electromagnetic compatibility. This direct current is provided by rectification of the required proportion at the transmitted power supply signals. An existing short-circuit mask can be used as the heating element which, for example, helically surrounds an inductive closed-field structure. In an implementation of a short-circuit mask which can be heated by means of direct current, the short-circuit mask can be disintegrated into fine heating coils which are capacitively short-circuited with respect to high frequency. In the embodiment of FIG. 9, for heating purposes, for example, the respective edge of each layer 38 to 41 can be constructed as an ohmic heating zone. As a result, a large heat-emitting surface can be achieved which can be occupied by appropriately meander-shaped heating paths. The larger the heat-emitting surface, the lower the required temperature rise, and thus the lower the required heating current. Such a heating element can be implemented in a simple manner to be integrated with a PCB laminate, without any problematic separate bonding points, and therefore with a high functional reliability.

As illustrated by the above description of several embodiments, the antenna system according to the invention has the advantage that no holes are required in the mounting surface for its mounting on a vehicle rear window or another mounting surface of a sufficiently low conductivity, even if a power supply to components mounted on the exterior side is required. The outside mounting of the antenna component avoids problems with respect to damping, shading and tuning of the antenna on the basis of the mounting surface. On the contrary, the geometrical and material characteristics of the mounting surface can vary within wide limits, as long as its electric conductivity remains sufficiently low. As the result, the antenna system according to the invention is well suited for retrofitting, and can also be used without modification for different vehicle types.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Antenna system for a data communication unit in a vehicle, comprising:
    an exterior part adapted to be arranged on an exterior side of a mounting surface of a vehicle body, and containing an antenna component and at least one energy-consuming active circuit component;
    an interior part adapted to be arranged on an interior side of said mounting surface; and
    coupling devices for signal coupling of the exterior and interior parts, said coupling devices including at least one signal transmission device which transmits electric power from a power supply signal generator, for powering said exterior energy consuming active circuit component, in a wireless manner through the mounting surface from the interior part to the exterior part.

2. The antenna system according to claim 1, wherein the at least one signal transmission device transmits power supply signals through the mounting surface inductively, and transmits data signals through the mounting surface via a linkage which is one of capacitive, inductive and optical.

3. The antenna system according to claim 1, wherein the at least one signal transmission device has an inductive open-field or closed-field helical-path structure on the interior and on the exterior parts.

4. The antenna system according to claim 3, characterizes at least one of the following:
   the inductive closed-field structure has several current path windings; and
   the inductive closed-field structure comprises a structure-encompassing short-circuit mask.

5. The antenna system according to claim 4, wherein the short-circuit mask simultaneously operates as an ohmic heating element which is fed with energy of the power supply signals transmitted from the interior part to the exterior part.

6. The antenna system according to claim 3, wherein the inductive closed-field structure is covered on its side facing away from the mounting surface by a magnetically conductive field guiding layer.

7. The antenna system according to claim 6, wherein on its side facing away from the inductive closed-field structure, the field guiding layer has an electrically highly conductive coating.

8. The antenna system according to claim 2, wherein the at least one signal transmission device has a plurality of light signal transmission routes for received data and data to be sent.

9. The antenna system according to claim 1, wherein:
   the exterior part includes an antenna amplifier; and
   the at least one signal transmission device comprises a capacitive coupling unit for transmission of data signals from the antenna component and a coupling coil unit for transmission of power supply alternating-voltage signals fed from the interior part.

10. The antenna system according to claim 9, wherein the antenna component, the antenna amplifier and an exterior coupling surface of the capacitive coupling unit are arranged next to or within an exterior coupling coil of the coupling coil unit.

11. The antenna system according to claim 1, wherein:
    the exterior part contains a signal processing unit; and
    the at least one signal transmission device has a coupling coil unit for transmitting both data signals and said power supply alternating-voltage signals between the signal processing unit and the interior-side system part.

12. The antenna system according to claim 11, wherein the antenna component and the signal processing unit are arranged next to or within an exterior coupling coil of the coupling coil unit.

13. The antenna system according to claim 1, wherein:
    the interior part contains at least one of an antenna amplifier and a signal processing unit; and
    the at least one signal transmitting device has a capacitive coupling unit for transmission of antenna signals between the antenna component, and one of the antenna amplifier and the signal processing unit.

14. The antenna system according to claim 1, wherein the interior part contains a coaxial line which guides both the antenna signals and the power supply alternating-voltage signals.

* * * * *